United States Patent
Erlach et al.

(10) Patent No.: US 7,302,834 B2
(45) Date of Patent: Dec. 4, 2007

(54) METHOD FOR SUPPLYING AN INTERNAL COMBUSTION ENGINE WITH CONDITIONED COMBUSTION GAS, DEVICE FOR CARRYING OUT SAID METHOD, METHOD FOR DETERMINING THE QUANTITIES OF POLLUTANTS IN THE EXHAUST GASES OF AN INTERNAL COMBUSTION ENGINE, AND DEVICE FOR CARRYING OUT SAID METHOD

(75) Inventors: Hans Erlach, Kühnsdorf (AT); Johann Simperl, Thal (AT)

(73) Assignee: AVL List GmbH, Graz (AT)

( * ) Notice: Subject to any disclaimer, the term of this patent is extended or adjusted under 35 U.S.C. 154(b) by 122 days.

(21) Appl. No.: 11/339,530

(22) Filed: Jan. 26, 2006

(65) Prior Publication Data

US 2006/0185425 A1    Aug. 24, 2006

Related U.S. Application Data

(62) Division of application No. 10/432,393, filed on Nov. 10, 2003, now Pat. No. 7,028,539.

(51) Int. Cl.
| | |
|---|---|
| *G01L 3/26* | (2006.01) |
| *G01L 5/13* | (2006.01) |
| *G01M 15/00* | (2006.01) |
| *G01N 7/00* | (2006.01) |
| *G01N 33/497* | (2006.01) |

(52) U.S. Cl. ......................... 73/116; 73/23.21

(58) Field of Classification Search .................. 73/116, 73/117.3, 118.1, 863.03, 23.31
See application file for complete search history.

(56) References Cited

U.S. PATENT DOCUMENTS

| | | | | | |
|---|---|---|---|---|---|
| 3,881,351 | A | * | 5/1975 | Prachar | 73/861.04 |
| 4,924,095 | A | * | 5/1990 | Swanson, Jr. | 250/338.5 |
| 5,649,517 | A | * | 7/1997 | Poola et al. | 123/585 |
| 6,134,942 | A | * | 10/2000 | Pasquereau et al. | 73/23.31 |
| 6,200,819 | B1 | * | 3/2001 | Harvey et al. | 436/179 |
| 6,470,732 | B1 | * | 10/2002 | Breton | 73/23.31 |
| 6,623,975 | B1 | * | 9/2003 | Tefft et al. | 436/137 |
| 6,701,255 | B2 | * | 3/2004 | Batug et al. | 702/24 |
| 6,729,195 | B2 | * | 5/2004 | Graze, Jr. | 73/863.03 |
| 7,021,130 | B2 | * | 4/2006 | Schmidt | 73/118.1 |

* cited by examiner

*Primary Examiner*—Michael Cygan
*Assistant Examiner*—Octavia Davis
(74) *Attorney, Agent, or Firm*—Dykema Gossett PLLC

(57) ABSTRACT

A method and apparatus for determining the quantities of pollutants in the exhaust gases of internal combustion engines wherein an essentially constant and fully conditioned quantity of humidity and/or temperature-conditioned combustion gas is supplied to the internal combustion engine at each instant whose quantity corresponds to at least the maximum quantity required by the respective combustion engine, wherein the exhaust gas is diluted with the quantity of combustion gas not used by the combustion engine, and then tested relative to quantities of pollutants and flow rate.

23 Claims, 13 Drawing Sheets

METHOD FOR SUPPLYING AN INTERNAL COMBUSTION ENGINE WITH CONDITIONED COMBUSTION GAS, DEVICE FOR CARRYING OUT SAID METHOD, METHOD FOR DETERMINING THE QUANTITIES OF POLLUTANTS IN THE EXHAUST GASES OF AN INTERNAL COMBUSTION ENGINE, AND DEVICE FOR CARRYING OUT SAID METHOD

CROSS-REFERENCE TO RELATED APPLICATION

This is a division of U.S. patent application Ser. No. 10/432,393, filed Nov. 10, 2003, now U.S. Pat. No. 7,028,539 the priority of which is claimed.

BACKGROUND OF THE INVENTION

1. Field of the Invention

The invention relates to a method for supplying an internal combustion engine with conditioned gas, particularly air, preferably on test benches, including the supply of humidity and/or temperature-conditioned gas to the internal combustion engine, as well as a device to carry out this method. The invention also relates to a method for determining the quantities of pollutants in the exhaust gases of an internal combustion engine, including the determination of the pollutant concentration and the quantity of the flowing exhaust gas, whereby dilution of the exhaust gas takes place by using a diluent gas of known composition. The invention also relates to a device to carry out this additional method.

2. The Prior Art

The condition of the intake air influences the operating behavior of an internal combustion engine to a great extent. For example, the engine torque increases in gasoline engines with increasing atmospheric pressure by approximately +0.12% per hectopascal. A temperature increase of the drawn-in ambient air by 1° C. causes in the same case a loss of power of approximately −0.5%, for example. The humidity content of the intake air has only minor direct influence on engine power; however, the consequences relative to exhaust gas emission is not to be disregarded, particularly nitrogen oxide, which can be the case in gasoline engines as well as in diesel engines. A higher humidity content of the intake air makes additionally possible in gasoline engines an earlier ignition time up to the point of the knocking limit, which has to be considered during tuning operation at the engine test bench.

Since the development of internal combustion engines places requirements that are becoming continuously higher relative to the ability to reproduce and the accuracy in test results, and based on exhaust gas regulations becoming more stringent worldwide as well as the higher power density, it is therefore necessary to eliminate all influences as much as possible which effect the test results in the development of engines. Since the intake air is also part of these influences, it is necessary to condition the same to obtain comparable test conditions at the test bench.

Known systems for conditioning of the intake air for internal combustion engines are available commercially (e.g. "Combustion Air Conditioning Unit of the firm AVL-List GmbH, Graz, Austria or FEV AirCon of the firm FEV Motortechnik GmbH, Aachen, Germany). However, these systems are directly connected to the air supply system of the internal combustion engine and they must follow in this way the changes of the operating condition of the internal combustion engine and the resulting change of airflow rate, and these systems must also follow thereby directly the changes of the rate of airflow of the internal combustion engine itself.

The maximum rate of airflow in a gasoline engine is about 40 times the minimum rate of airflow. It is therefore understandable that during rapid dynamic changes of the rate of airflow in a combustion engine, known systems can follow these changes only to a limited degree and only a poor control quality of the conditions in the air is obtained during the dynamic changes in the rate of airflow. An example for a known system of this type is described in DE 40 15 818 C2.

In DE 25 36 047 A1 is described, in contrast, a pure negative pressure simulation while no steps are taken for complete conditioning of the combustion air. Furthermore, there is a box provided in the disclosed device into which enters the combustion air intended for combustion in the internal combustion engine together with the exhaust gas of the engine, and wherein they may be combined or influence one another whereby conditioning (of the air) is made almost impossible under reliable and constant conditions. The risk of mixing of combustion air with exhaust gas is very great, especially in highly dynamic operating conditions in a device such as the one disclosed in DE 25 36 047 A1, based on pressure pulsation, wide-reaching turbulence, thermal gradients etc. In addition, the combustion air is drawn into said box depending on the demands of the engine, which does almost never allow the carrying-out of constant conditioning as well.

The first object of the invention is to avoid these and other disadvantages of the traditional conditioning method and conditioning devices, and to make possible, to a great extent, reliable and constant conditioning of the combustion air even under dynamic and highly dynamic operating conditions.

An additional subject area in the field of engine-testing technology is the exhaust gas measuring technology by which there is to be determined the existing pollutant quantities from the measurable pollutant concentrations in the exhaust gas of the engine. For this calculation is necessary the quantity (mass) of the flowing exhaust gas from which the exhaust gas sample has been taken. This has to be measured either directly or it can be determined with the use of the subsequent balance of the mass flows: supplied air mass+supplied fuel mass=discharged exhaust gas mass. The supplied fuel mass can thereby be measured highly accurate and dynamically. Relative to the term "pollutant quantity", it is to be noted that the subject matter is almost exclusively pollutant mass in the standards and guidelines for exhaust gas analysis. Sensors to determine pollutants in a gas flow measure in general the pollutant concentration, which means the quantity of pollutants—practically exclusively the pollutant mass (e.g. in milligrams)—relative to a reference quantity of gas (mass or volume under actual or under standard conditions). The measured concentration at the measuring point has to be multiplied by the corresponding flow quantity (mass flow or volume flow).

A simple system for the accurate use of the balance equation is established when either the flow of the supplied air or, especially advantageously, the flow of the discharged exhaust gas is kept constant. This occurs, for example, in the exhaust gas testing technology with the so-called CVS systems (constant volume sampling), which are standardized and which are established accurate devices for the determination of pollutant quantities in the exhaust gas. High dilution factors are generally required for the CVS systems.

Extremely low pollutant concentrations are created especially in low-pollution engines as a result thereof, which can almost not be detected any longer by the analyzers. An alternative to the CVS system for the determination of pollutant quantities is now the analysis of the undiluted or comparatively minor diluted exhaust gas in combination with the direct measuring of either the incoming flow of air mass or, especially advantageous, the flow of exhaust gas mass. However, this method could not be carried out properly up to now since the sensors needed for this purpose have various inherent faults. Among other things, the high dynamic of engine operation and the strong flow pulsation as well as the pressure pulsations overriding the average flow are detected only insufficiently and the sensors are, in general, not sufficiently suited for the hot and corrosive exhaust gases. For the solution of these problems were proposed suppression chambers and flow-measuring arrangements for the average flow, which have to be built, however, having very large dimensions, which are very difficult to be used on the engine and which oftentimes falsify the conditioned operating conditions of the engine.

It was therefore another object of the invention to provide a method and a device which make possible a precisely defined dilution of the exhaust gas and thus a precise determination of the quantities of pollutants in a simple and reliable manner.

SUMMARY OF THE INVENTION

The firstly mentioned object relative to the conditioning of the combustion gas is achieved according to the invention in that an essentially constant and fully conditioned quantity of combustion gas is provided at each instant whereby said quantity corresponds to at least the maximum quantity required by the respective internal combustion engine. Through this measure, conditioning does not have to be performed again dynamically, but the engine on the test bench has branches (in the supply line) for the maximal required quantity of combustion air diverting the quantity of combustion air needed for the actual operating conditions, respectively. The conditioning system disposed upstream (from the engine) has to be designed nevertheless for the maximum quantity of combustion air whereby a constant flow of mass passes through the conditioning path in the case of the invention and whereby control is made correspondingly simple.

According to an advantageous additional characteristic of the invention, it is proposed that the combustion gas not used by the internal combustion engine bypasses the internal combustion engine and is then mixed with its exhaust gas. It is made possible thereby in a simple manner to obtain a small and a roughly adjustable pressure differential in the system between the branching-off point of the combustion air actually needed by the engine and the discharge port of the exhaust gas, and thereby is also ensured a substance separation of combustion air and exhaust gas.

A simply realizable negative pressure control of the system can be achieved if the combustion air/exhaust gas mixture downstream from the engine is suctioned out, preferably with a defined negative pressure relative to the atmospheric pressure.

Otherwise, there can be proposed alternatively or additionally that the combustion gas is delivered to the internal combustion engine under increased pressure relative to the atmospheric pressure—or unneeded combustion gas is diverted to bypass the internal combustion engine.

It is advantageously proposed thereby that between the conditioned combustion gas and the exhaust gas or the combustion gas/exhaust gas mixture there is set a pressure drop, downstream from the internal combustion engine, between 0.3 and 5 mbar, preferably between 0.5 and 3 mbar.

It is made possible thereby to condition (the gas) to pressures between at least −300 mbar and +300 mbar on the intake-side as well as on the exhaust-side of the engine. This is achieved through a type of CVS method with at least a small excess of combustion gas of at least approximately 1.2 times the maximum quantity needed by the engine. The small drop in pressure also ensures that the intake as well as the exhaust of the internal combustion engine, or systems disposed upstream or downstream, are kept essentially on equal pressure level for correct negative or positive pressure simulation. The actual value measurement for pressure control occurs preferably at the intake section of the engine, which means that the pressure at the port of the engine exhaust system follows the pressure at the intake section within the predefined drop in pressure.

According to an additional advantageous characteristic of the invention, it is proposed that the flow is kept essentially constant, independent from the absolute pressure. With "flow", it could mean here and in the following text, a flow of mass as well as a flow of volume as a flowing quantity. At constant flow, there are possible large and possibly dynamic pressure fluctuations by keeping the small control effort for the conditioning of gas and the correspondingly simple design of the system is thereby made possible. Diverse known devices may be employed to keep the flow of combustion gas (air) constant or of other gases developing subsequently, such as (diluted) exhaust gas. Roots blowers or similar gas moving devices can be employed which move a constant gas volume per working stroke or rotation so that the flowing mass is dependent on the pressure and temperature of the gas, the working stroke frequency, or the speed of rotation. Critical nozzle(s) or Venturi tube(s) among others, can be provided having a gas moving device (suction fan) downstream in which the quantity of flowing gas is determined by the size of the cross section of the respective most narrow section in the nozzle(s) and the therein resulting sonic velocity. This means, that the flowing volume and the flowing mass are only dependent on the pressure and temperature of the gas upstream from the nozzle—but not on the pressure downstream from the nozzle. An additional embodiment of a device to keep the flow constant would be uncritical nozzles in which the dependency on backpressure is considered through a respective measuring and control technology. All such devices to keep the flow constant must be calibrated in the rule. The flow of interest (e.g. flow of mass or flow of volume under actual or under standard conditions) is then determined by the corresponding calibration factor of the device and by the pressure and temperature of the gas (air) upstream from the device.

In order to improve high-altitude simulation even more, it is proposed according to an additional characteristic of the invention that the direct ambiance of the internal combustion engine is kept at the same pressure as the pressure of the conditioned combustion gas. The same condition exists thereby all over in the area of the internal combustion engine, which makes the simulation substantially more accurate on the test bench at the respectively desired sea level.

The internal combustion engine is advantageously surrounded by a flow of conditioned combustion gas whereby it is made possible to use the intake air in this way also as realistic ambient air of the motor, particularly relative to temperature. However, attention must be paid that sufficient air is moved through the bypass line so that no improper temperatures develop, particularly temperatures that are too high. For example, it can be advantageous in case of possibly provided gas-moving devices or possibly connected exhaust gas measuring equipment, if the diluent gas fed into the exhaust gas is not hotter than 30° C., preferably not hotter than 25° C. On the other hand, condensation of the contained water vapor should not occur in the undiluted nor in the diluted exhaust gas. For this reason, one has to pay attention that the temperature of the diluted exhaust gas is not too low—or that it does not drop below 50° C., for example. Depending on the type of application, it could therefore be necessary to separately adjust the temperature of the gas in the supply line, e.g. by means of an additional heat exchanger.

The second object based on the invention is achieved in accordance with the characteristics essentially mentioned above in that an essentially constant and fully conditioned quantity of humidity and/or temperature-conditioned combustion gas is supplied to the internal combustion engine at each instant whose quantity corresponds to at least the maximum quantity required by the respective combustion engine, and whereby the exhaust gas is diluted with the quantity of combustion gas that is not used by the internal combustion engine. The novel system can thereby be employed advantageously in the exhaust gas testing technology in which it is used for defined diluting of the exhaust gas. The low excess of combustion gas needed for conditioning of at least approximately 1.2 times the maximum quantity required by the engine is in most cases set too low for CVS systems—even if there is only a low requirement on precision demanded relative to the precision for measuring the pollutant quantities—and said quantity of excess combustion gas should thereby be greatly increased, in general. It therefore proposed to provide excess in-flowing conditioned combustion gas in the range of at least 4 to 10 times the quantity required by the engine to be used for diluting the exhaust gas of the internal combustion engine.

The valves for the flowing quantities (mass) are necessary to determine now the concentration of the pollutant quantity measured in the exhaust gas that is actually discharged by the internal combustion engine. According to the first embodiment variation of the invention, it is thereby proposed to keep constant the flow of the discharging gas and the flow of exhaust gas diluted by the quantity of unused combustion gas and to determine the quantity of combustion gas supplied to the internal combustion engine as well as the quantity of fuel.

Since the determination of essentially constant values is very simple, it can thereby be proposed that the flow of discharging exhaust gas, diluted by the unused quantity of combustion gas, is kept constant and is defined.

Alternative to the above object, it is nevertheless possible to determine the quantity of pollutants in that the flow of the supplied combustion gas is kept constant, and its quantity and the quantity of fuel supplied to the internal combustion engine is determined as well.

The flow of the supplied combustion gas is thereby kept advantageously constant and the flow of the diluted exhaust gas is determined as well. This variation occurs preferably with a relatively minor diluted exhaust gas and it has the advantage that requirements for the flow sensor are considerably lowered since in this case, there is, on one hand, a nearly constant flow of exhaust gas mass and, on the other hand, the exhaust gas pulsates less, is not hot, and is less corrosive as a result of the diluted (thinned) air.

According to an additional characteristic of the invention, it is proposed that the determination of pollutant concentration occurs in the exhaust gas, which is diluted with the quantity of combustion gas not used by the internal combustion engine. Applicable are here also the facts mentioned above relating to the flow sensor and relating to the sensor or the sampling device for pollutant concentration.

According to an additional embodiment example of the invention, the determination of the pollutant concentration can, of course, occur also in the undiluted exhaust gas and the determination is there more direct and more correct relative to possible other substances carried along in the diluent gas.

If a direct measurement of the pollutant concentration is necessary, it can be proposed that the pollutant concentration in the available combustion gas is determined in addition. This value can be considered in the determination of the quantity of pollutants emitted by the internal combustion engine.

In the method for the determination of the quantity of pollutants, is can be advantageously proposed that the quantity of available combustion gas is a multiple of the maximum quantity required by the combustion engine.

The determination of pollutant emission is also necessary at different sea-level conditions and/or environmental conditions so that this simulation can be provided here also in that the combustion gas/exhaust gas mixture downstream from the internal combustion engine is moved by suction, preferably by a defined negative pressure relative to the atmospheric pressure—or that the combustion gas is delivered to the internal combustion engine through increased pressure relative to the atmospheric pressure or whereby unneeded combustion gas bypasses the internal combustion engine.

In each case it is thereby again of advantage if there is set a pressure drop between 0.3 and 5 mbar, preferably between 0.5 and 3 mbar, between the conditioned combustion gas and the exhaust gas or the combustion gas/exhaust gas mixture downstream from the internal combustion engine.

In the determination of pollutants in the exhaust gas, the flow is kept advantageously and essentially constant, independent from the absolute pressure.

Precise simulation of various sea-level conditions and/or environmental conditions may also be achieved through the method of exhaust gas testing if the direct ambiance of the internal combustion engine is kept at the same pressure as the pressure of the conditioned combustion gas, or if a flow of conditioned combustion gas surrounds the internal combustion engine.

Attention must be paid thereby, particularly during the use of negative pressure for high-altitude simulation, that the respective measuring device is also under the ambient air pressure; however, these measuring devices are generally not designed for an exhaust gas pressure of down to −300 mbar. It is therefore to be proposed that the negative pressure existing during exhaust gas analysis must be compensated with an additional pump. In measuring with the CVS system, double dilution is not permissible in the LD range. The following possibilities exist therefore in taking measurements: either diluted modal exhaust gas testing (analysis), however, exclusively with heated analyzers based on the low dilution ratio, additional measuring of the (almost) constant airflow upstream from the branching-off point of the supply line to the internal combustion engine—or, the entire system is to be enlarged in such a manner that minimum dilution rates of $r_{dil} \geq 4$ are achieved.

The first object stated in the beginning is also achieved according to the present invention through a device to supply an internal combustion engine with conditioned combustion gas whereby said device comprises a supply line leading to the internal combustion engine for humidity and/or temperature-conditioned combustion gas, and possibly a blower in the supply line, and said device is characterized in that the supply line or supply passage is designed for at least the maximum quantity of combustion gas required by the respective internal combustion engine whereby a suction pipe, which can be connected to the internal combustion engine, branches off from said supply line. Beside the advantages mentioned already above relative to the method, the described inventive device with its supply line has the advantage that there exists a good flow characteristic, which ensures for the combustion air in the engine that no backup-mixing of exhaust gases can take place and that there is no change in the parameter of the conditioned combustion air.

According to an additional characteristic of the invention, an exhaust gas line, connectable to the internal combustion engine, joins the supply line downstream from the branching-off point of the intake line. Thereby is offered the possibility of negative pressure control while maintaining all previously mentioned advantages.

In the inventive device are also advantageously provided elements for the adjustment of a pressure differential in the range between 3.5 and 5 mbar, preferably between 0.5 and 3 mbar, which are disposed between the branching-off point of the intake line and the merging point of the exhaust gas line with the respective supply line. Thus, a reliable substance separation can be guaranteed between combustion air and exhaust gas for all operational conditions of the engine—from idling up to full power.

This effect can be obtained in the same way—or it can be additionally guaranteed—if there are provided devices to ensure a minimum flow rate between the branching-off point of the intake line and the merging point of the exhaust gas line, at least corresponding to the diffusion rate of exhaust gas in the conditioned combustion gas.

Apart from the possibility of connecting the inventive device to a central conditioning system, it is also possible to include conditioning with the inventive device itself whereby, in this case, the devices for adjustment and control of the temperature and/or humidity are provided upstream from the branching-off point of the intake line in the supply line leading to the internal combustion engine, e.g. gas coolers, mist eliminators, gas heaters and vapor delivery lines, preferably having vapor metering valves.

In one embodiment of the inventive device it is proposed that a gas-moving device be provided to be able to conduct positive pressure control whereby said gas-moving device is disposed upstream from the branching-off point of the intake line and a control device is provided downstream from the merging point of the exhaust gas line for the gas flow.

Otherwise, negative pressure control is possible if a control device for the gas flow is provided upstream from the branching-off point of the intake line and a gas-moving device is provided downstream from the merging point of the exhaust gas line. Both of the above-mentioned control variations can be used in combination, of course.

At least one heat exchanger is advantageously provided between the internal combustion engine and the gas-moving device to avoid difficulties in the design of the gas-moving device, particularly in the form of a centrifugal blower of a radial blower, whereby an exhaust gas/air mixture could develop during the operation of the system at great negative pressure and/or based on turbulence. Operation under negative pressure is thereby possible, even up to approximately 500 mbar (which corresponds to approximately 6,000 meters above sea level.)

Relative to the choice of gas-moving devices, suitable types to be selected depend on the respective requirements. For example, there are two advantages in case of Roots blowers: On one hand, negative pressures up to 550 mbar are no problem (this is necessary to ensure −500 mbar in the suction pipe) whereas centrifugal blowers have a limit of approximately 450 mbar in the desired dimensions. On the other hand, the negative pressure as well as the positive pressure can be controlled by means of a speed-controlled Roots blower and thus a butterfly valve is unnecessary at the end of the collecting box since the flow can be restricted by means of the Roots blower. However, a throttle valve is arranged for negative pressure operation after the conditioning path and upstream from the engine so that the conditioning path is not biased by great negative pressure.

The Roots blower moves a nearly constant volume flow at constant speed, independent from the air pressure. However, the air-mass flow changes correspondingly to the changes in pressure. The throttle valve can be correspondingly adjusted depending on the air pressure to keep the air-mass flow nearly constant in the conditioning path (these adjustments are determined during operation and are forwarded to the control device accordingly.) Pressure control occurs then through speed control of the Roots blower (for instance, via PID (proportional-integral-differential) control devices.)

The disadvantage of the Roots blower lies in the maximum possible temperature of the delivered gas mixture, which is limited to approximately 50-60° C. Should there only be required negative pressures of approximately 350 mbar, then one can resort to the centrifugal blower that can be operated at a temperature of up to approximately 150° C.

Control of quantity can be accomplished in a simple and reliable manner if the control devices for the gas flow are designed in the form of butterfly valves.

A precision control valve may be provided thereby in an advantageous manner parallel to the butterfly valves.

In addition, substance separation can be ensured if a gas-moving device is provided between the branching-off point of the intake line and the merging point of the exhaust line. The desired pressure differential between the intake-side and exhaust-side of the engine can be adjusted or influenced through said gas-moving device.

According to an additional embodiment or in combination with one of the above-described devices, substance separation may also be achieved in that devices are provided for the laminarization of the flow in the supply line, preferably at least between the branching-off point of the intake line and the merging point of the exhaust gas line.

An additional alternative to achieve this effect is to provide a shock drag and/or a muffler in the supply line between the branching-off point of the intake line and the merging point of the exhaust gas line.

For the simple and economical design of the system, highly dynamic events should have no effects on the internal combustion engine—or it should have only the smallest effects on the required quantity of conditioned gas. According to an advantageous embodiment of the invention, the device is characterized in that at least one of the gas-moving devices is in controlled communication with the opposite control device, relative to the internal combustion engine, for the gas flow. A control concept can be realized thereby, which keeps the flow through the system essentially constant even under dynamic pressure changes.

The moving capacity of the gas-moving device is thereby advantageously adjustable dependent on the position of the control device disposed on the opposite side. If, for example, a throttle valve is adjusted to the change of pressure operating in the system—or of a pressure sequence—then the speed of a gas-moving device designed as a centrifugal blower, for example, is matched in such a manner that the flow quantity of conditioned gas remains essentially constant, independent from the absolute pressure.

It is proposed according to an additional characteristic of the invention, that to make an engine test as real as possible under precisely defined conditions, the distance between the branching-off point of the intake line and the merging point of the exhaust gas line should correspond substantially to the distance between the air filter intake and the end of the muffler system of the vehicle whose internal combustion engine is supplied with conditioned combustion gas.

According to an additional characteristic of the invention, it is proposed that a closed space is provided to receive the internal combustion engine whereby said closed space is connected to the section of the supply line between the branching-off point of the intake line and the merging point of the exhaust gas line. The engine to be tested is thereby biased with the pressure existing in the connecting line whereby said pressure influences the engine from the outside, which is a great advantage, particularly in high-altitude simulation (low air pressure).

Advantageously there is provided a closed space to receive the internal combustion engine in the section between the branching-off point of the intake line and the merging point of the exhaust gas line. This space formed by a closeable and sealable box, relative to the ambiance, can be a component of the engine test bench and can thereby remain on the test bench if another engine is to be tested on the (same) test bench. However, the box is advantageously a component of the pallet onto which the engine is installed and which is made for transporting and stabilizing the engine on the test bench.

For the achievement of the second object, which is based in substance on the invention, there is provided a device to determine the quantities of pollutants in the exhaust gas of an internal combustion engine comprising at least one measuring point, for example a sensor or sampling device, for determination of the pollutant concentration, and a determination device for the flow of gas whereby said determination device is provided with a passage leading from the exhaust gas passage to the supply passage for a diluent gas of known composition. According to the invention, this passage is characterized in that the supply passage for the diluent gas is designed for at least the maximum quantity of combustion gas required by the respective internal combustion engine and whereby an intake line (suction pipe), which can be connected to the internal combustion engine, branches off from said supply passage. The determination device to determine the constant or nearly constant flow (mass or volume) of combustion gas (air) or of (diluted) exhaust gas can be realized in various known ways, for instance with a flow sensor for the mass or volume flow, such as a hot-wire (thermal) or an ultrasound measuring system, or a measuring system for pressure and temperature of the gas, disposed directly in front of the device, to keep the flow constant whereby the calibration constant and possible other values of this device are considered in the determination of the flow (e.g. the speed of the Roots blower.)

The supply passage for the diluent gas is thereby advantageously designed for a multiple of the maximum quantity of combustion gas required by the respective internal combustion engine.

According to an additional characteristic of the invention, the measuring point to determine the pollutant concentration in the exhaust gas passage is arranged downstream from the merging point of the exhaust gas passage into the supply passage for the diluent gas, to lower the requirements for the sensor or sampling device and to employ said sensor where a nearly constant exhaust-gas mass flow exists, on one hand, and where, on the other hand, the exhaust gas pulsates less, is not as hot, and is less corrosive.

In contrast, a more precise measurement is possible with robust sensors or instruments (since it is conducted in a direct manner) if the measuring point for the determination of the pollutant concentration in the exhaust gas passage is arranged upstream from its merging point into the supply passage of the diluent gas.

An additional measuring point to determine the pollutant concentration is advantageously provided in the supply passage for the diluent gas, upstream from the merging point of the exhaust gas passage into said supply passage, to be able to additionally consider the pollutant burden of the diluent gas.

The same effects and advantages as mentioned above can be achieved relative to the determination device for the flow of a gas, if said determination device is arranged in the same section as the measuring point for the determination of the pollutant concentration.

According to an alterative embodiment of the inventive device, there is a determination device for the flow of gas provided in the supply passage for the diluent gas and there is also advantageously provided a measuring device for the fuel mass delivered to the internal combustion engine whereby these devices are provided to carry out a method to determine the flow of mass of the exhaust gas with the use of a balance equation of supplied combustion gas and supplied fuel quantity. However, both devices may also be provided as a single unit or in combination for calibration or for checking the values detected directly by sensors.

BRIEF DESCRIPTION OF THE DRAWINGS

The invention is to be described in more detail in the following description with the aid of accompanying drawings.

DETAILED DESCRIPTION OF THE INVENTION

Figure 1:
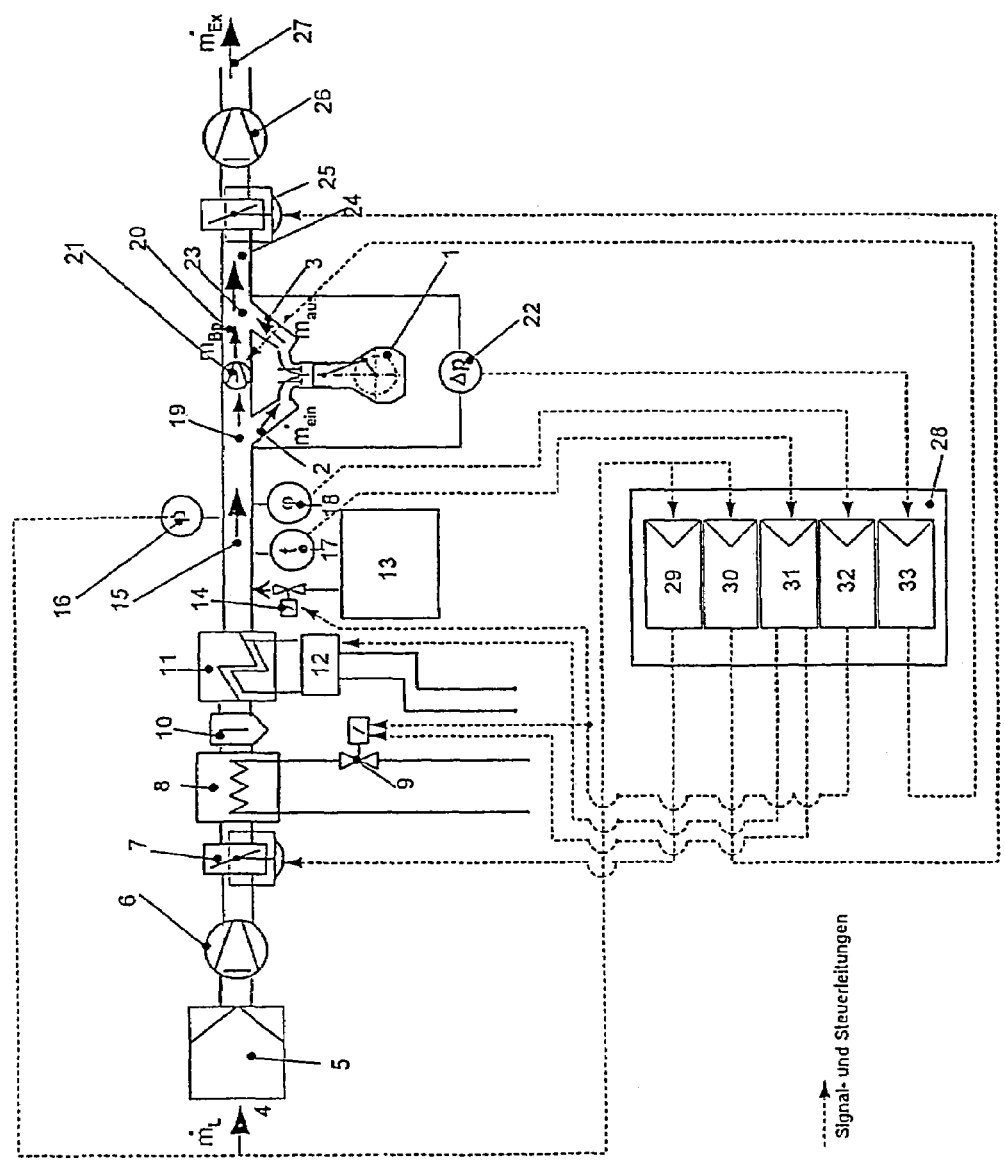
FIG. 1 shows thereby schematically a system according to the invention for positive pressure operation and negative pressure operation.

The system according to the invention, having already an integrated conditioning path (as seen in the direction of the air flow) consists of a dust filter 5 having an intake opening 4, a device for movement of air 6, preferably a radial fan or a blower, a butterfly valve for negative pressure operation 7, and air cooler 8—preferably and air/cold-water heat exchanger having a throughput of a cooling medium that is adjustable for cold water 9—a mist collector for condensate 10, as well as an air heater 11 that is adjustable in its heating capacity by means of a control device 12. A vaporizer 13 can be arranged to control humidity from which vapor can be metered into the main air passage 15 via a vapor metering valve 14 to adjust the humidity. An absolute pressure sensor 16, a temperature sensor 17 and a humidity sensor 18 serve to measure the condition of the air.

The conditioned air in these system components is moved through the main air line 15 of the branching off point 19 between the main line 20 and the intake passage 2 at a quantity that corresponds to the maximum quantity used by the engine. Thus, always the same quantity of incoming air is to be treated by the conditioning path 4 through 18 upstream, which makes the design extremely simple—particularly the conditioning. All changes in the operation of the engine to be tested can thereby be included as well, even all highly dynamic transition elements, and a constant conditioned quantity of combustion air is supplied at each instant to the internal combustion engine 1. A small speed-controllable axial fan 21 can be optionally arranged in the main passage 20 for compensation of pressure loss or for adjustment of a precisely defined pressure differential between the intake passage 2 and the exhaust gas passage of the engine 1, whereby said fan 21 is adjusted in its speed with the aid of the controlling device 33 depending on the differential pressure between the intake and discharge of line 20. Measuring of this differential pressure is conducted with the differential pressure sensor 22. The line 20 and the exhaust gas passage 3 of the internal combustion engine 1 run via a merging piece 23 into the air evacuation passage 24. A butterfly valve for positive pressure operation 25 is arranged at the end of said air evacuation passage 24. An air-moving device 26 for negative pressure operation—preferably a radial fan or a blower—is disposed upstream from the air evacuation opening 27 for the discharge of the air-evacuation flow into the atmosphere or into the exhaust gas system of the test bench. An additional heat exchanger could possibly be arranged between the internal combustion engine 1 and the air-moving device 26, preferably in the air evacuation passage 24, whereby the design of the air-moving device is simplified and the choice of possible other types (of devices) is widened and problems are avoided through the exhaust gas/air mixture downstream from the combustion engine 1 and/or through the operation at great negative pressure (up to 350 to 400 mbar.)

An electronic adjustment and control device 28 is provided for the operation of the system and to set the desired air conditions into which devices there are integrated all necessary adjustment devices required for the operation of the equipment and all control devices for pressure 29 and 30, temperature 31 and humidity 32. Consideration was advantageously given so that the mass flow is kept essentially constant, independent from the absolute pressure. For this purpose, one of the gas-moving devices 6, 26, 21 at the equipment-side is in controlling communication with the opposite control device 7, 25, relative to the combustion engine 1, for the gas flow. Since there were heretofore only small, insignificant pressure changes demanded in the positive pressure operation, this control concept is mainly of importance for the negative pressure operation for which the control 7, which is arranged upstream from the internal combustion engine 1, is in controlling communication with the gas-moving device 25 disposed downstream from the internal combustion engine 1. The transporting capacity of the gas-moving device 6, 26, 21, which most often depends on the (rotational) speed, is set according the position of the control device that is designed mostly as a throttle valve.

The functioning mode of the method can be described with the aid of FIG. 1 as follows:

The internal combustion engine 1 draws in the air mass flow $\dot{m}_{in}$ required for combustion through the intake passage 2 and feeds said air mass flow to the combustion. The developing exhaust gas mass flow $\dot{m}_{out}$ resulting from the combustion is subsequently discharged through the exhaust gas passage 3. It is the object of the method to adjust the conditions of the air at the intake port of the intake passage 2, which means pressure, temperature and humidity, independent from ambient conditions. Moreover, the pressure at the discharge port of the exhaust gas passage 3 should match the pressure at the intake port of the intake passage 2 to a great extent. The air path during operation of the internal combustion engine on the test bench is thereby as follows: Based on the effect of the two air-moving devices 6, 26, a defined air mass flow $\dot{m}_L$ is moved through the intake opening 4, through the air-moving device 6, the butterfly valve for negative pressure operation 7, the air cooler 8, the mist collector 10, the air heater 11, and into the main air passage 15. At the branching-off point 19 of the main passage 20 and the intake passage 2 occurs a separation of the air mass flow $\dot{m}_L$ into the main-passage air mass flow $\dot{m}_{Bp}$ and into the exhaust-gas air mass flow $\dot{m}_{in}$. The bypass air mass flow $\dot{m}_{Bp}$ is moved by a speed-controllable axial fan for compensation of the pressure loss 21, and at the merging point 23 of the exhaust gas passage, said air mass flow merges again into the main passage 20 together with the exhaust-gas mass flow $\dot{m}_{out}$ onto the evacuation mass flow $\dot{m}_{Ex}$. Said evacuation mass flow $\dot{m}_{Ex}$ is moved through the butterfly valve for positive pressure operation 25, the air-moving device for negative pressure operation 26 and through the evacuation-air opening 27 into the atmosphere or into the evacuation-air system of the test bench.

The following relationships can be cited based on the law of mass conservation and continuity as interrelationship of individual air mass flows or exhaust-gas mass flows:

$$\dot{m}_{in} = \text{variable as function of the operational engine condition.} \quad \text{(i)}$$

$$\dot{m}_{out} = \dot{m}_{in} + \dot{m}_{Br} \quad \text{(ii)}$$

whereby $\dot{m}_{Br}$ is the mass flow of the fuel required for combustion.

However, the following is true for the use of conventional liquid of solid fuels or a nearly stoichiometric or super-stoichiometric combustion method:

$$\dot{m}_{Br} \square \dot{m}_{in} \quad \text{(iii)}$$

For example, in the use of commercial diesel fuel, the stoichiometric air requirement is 14.5 $\frac{kg\ air}{kg\ fuel}$ and true is therefore $$\dot{m}_{Br} = \dot{m}_{in}/14.5, \text{which validates the above mentioned interrelationship.} \quad \text{(iii)}$$

Based on (iii), a fuel mass flow can be neglected for a rough estimate of the mass flow and (ii) can also be stated as:

$$\dot{m}_{out} \approx \dot{m}_{in} \quad \text{(iv)}$$

The air mass flows $\dot{m}_L$ and $\dot{m}_{Ex}$, which exist at the components to control air conditions, and thereby the decisive values for the quality of control of the method can be stated for all operational conditions of the internal combustion engine (1) as follows:

$$\dot{m}_L = \dot{m}_{in} + \dot{m}_{Bp} \quad \text{(v)}$$

and $$\dot{m}_{Ex} = \dot{m}_{out} + \dot{m}_{Bp} \quad \text{(vi)}$$

by using (iv) in (v) and (vi) it can thus be stated:

$$\dot{m}_L \approx \dot{m}_{Ex} \quad \text{(vii)}$$

It is obvious thereby that the air mass flows $\dot{m}_L$ and $\dot{m}_{Ex}$, which are decisive for the control of the condition of the air, are nearly independent from the operational condition of the internal combustion engine 1 and its dynamic behavior are therefore only dependent on the design and the operating mode of the technological control component. It is thereby apparent that dynamic changes can follow the operating mode of the internal combustion engine. A change in the operating mode of the internal combustion engine causes merely a change of temperatures and thereby a change in the density of the air mass $\dot{m}_{Ex}$. These changes may also be compensated with this method through the behavior of the control device; however, these changes may be influenced by the general design parameter of the system to a great degree, e.g. the size of the air mass flow flows $\dot{m}_L$.

The control of the conditions of the air flow $\dot{m}_L$ and the pressure of the air mass flow $\dot{m}_{Ex}$ is performed as follows:

Control of Pressure at Positive Pressure Operation:

If the desired air pressure is to be higher than the ambient pressure, the control of the air pressure is performed through pressure increase and movement of the air mass flow flow $\dot{m}_L$ by the air-moving device 6 in cooperation with the butterfly valves for positive pressure operation 25. The air-moving device 6 is operated at constant speed whereby the air mass flow is chosen to be at least equal, advantageously even considerably greater, than the maximum air consumption of the internal combustion engine 1. The pressure in the entire line system is raised to the desired air pressure through throttling of the air mass flow with the butterfly valve for positive pressure operation 25 from the discharge port at the air-moving device 6 to the butterfly valve for positive operation. The position of the butterfly valve for positive pressure operation 26 is adjusted thereby via the electronic control device for the positive-pressure butterfly valve 30. The actual pressure in the pipe system is thereby measured by the absolute pressure sensor 16 and it is converted into an electric signal proportional to the pressure. This signal is transmitted to the control device for the positive-pressure butterfly valve 30 as actual signal. The control device 30 compares the actual signal with the reference variable desired by the user and produces a reference signal for the positive-pressure butterfly valve 26 whereby said reference signal is proportional to the position of the butterfly valve. In this operating mode, the position of the negative-pressure butterfly valve 7 is completely opened to avoid undesired throttle effects at this valve.

Control of Pressure at Negative Pressure Operation:

If the desired air pressure is to be lower than the ambient pressure, control of the air pressure is performed through throttling at the butterfly valve for negative pressure operation 7 and through movement of the air mass flow $\dot{m}_L$ by suction via the air-moving device for negative pressure operation 26. The air-moving device 26 is operated at constant speed whereby the air mass flow is again chosen to be at least equal to the maximum air consumption of the engine 1, again preferably even considerably greater. Through throttling of the air mass flow with the butterfly valve for negative air pressure 7, the pressure in the entire line system is lowered to the desired air pressure from the butterfly valve for negative pressure operation to the suction-side of the air-moving device 26. The position of the butterfly valve for negative pressure operation 7 is thereby adjusted by the electronic control device for the negative-pressure butterfly valve 29. The actual pressure in the pipe system is thereby measured by the absolute pressure sensor 16 and it is converted to an electric signal proportional to the pressure. This signal is transmitted to the control device for the negative-pressure butterfly valve 29 as actual signal. The control device 29 compares the actual signal with the reference variable desired by the user and produces a reference signal for the negative-pressure butterfly valve 7 whereby said reference signal is proportional to the position of the butterfly valve. In this operating mode, the position of the butterfly valve for positive pressure 25 is completely opened to avoid undesired throttle effects at this valve.

Control of Temperature:

The adjustment of temperature of the air mass flow $\dot{m}_{in}$ occurs with the aid of the effect of the air cooler 8 and the air heater 11. Heating or cooling of the air mass flow can occur according to the desired nominal temperature. The actual temperature is measured by the temperature sensor 17 and is converted to an electric signal proportional to the temperature. This signal is transmitted to the control device for temperature 31 as actual signal. The control device 31 compares the actual signal with the reference variable desired by the user and it produces a steady reference signal to the control valve for cold water 9 or to the regulating device for the output of heat 12. Adjustment of the desired nominal temperature is performed thereby through adjustment of the required cycling of a cooling medium through the air cooler and/or adjustment of the required heat output of the air heater. Operational conditions could develop that require cooling and subsequently heating as well (see also control of humidity.)

Control of Humidity in Air:

Adjustment of humidity of the air mass flow $\dot{m}_{in}$ occurs with the aid of the effect of the air cooler 8 and through metering of vapor from the vapor generator 13. The air mass flow $\dot{m}_L$ is cooled down in the air cooler to below the dew point and is dried as a result of the thereby caused condensation of the humidity contained in the air flow. The developing condensate is collected during the flow through the mist collector and is (subsequently) discharged. The adjustment of the desired humidity occurs through metering of water vapor into the air flow of the main air passage 15. The actual humidity is measured by the humidity sensor 18 and is converted to an electric signal proportional to the humidity. This signal is transmitted to the control device for humidity 32 as actual signal. The control device 32 compares the actual signal with the reference variable desired by the user and produces a steady reference signal for the control valve for cold water 9 or for the vapor metering valve 14 depending on the requirement for cooling (dehumidifying) or humidifying.

With the two above-mentioned control values is also the goal connected to prevent condensation (of mainly water vapor) in the diluted exhaust gas. The temperature of the diluted exhaust gas must thus be higher than its dew point, which is generally lower than 52° C. for the undiluted exhaust gas. Therefore, a heating device can be provided additionally for the combustion gas flowing through the main air passage 15. However, the exhaust gas of the internal combustion engine is most often much hotter than the gas used to dilute the exhaust gas (namely the combustion gas not required by the internal combustion engine 1) so that the diluted exhaust gas is heated up relative to the diluent gas and no condensation develops in (almost) all cases—even without additional heating.

Figure 2:
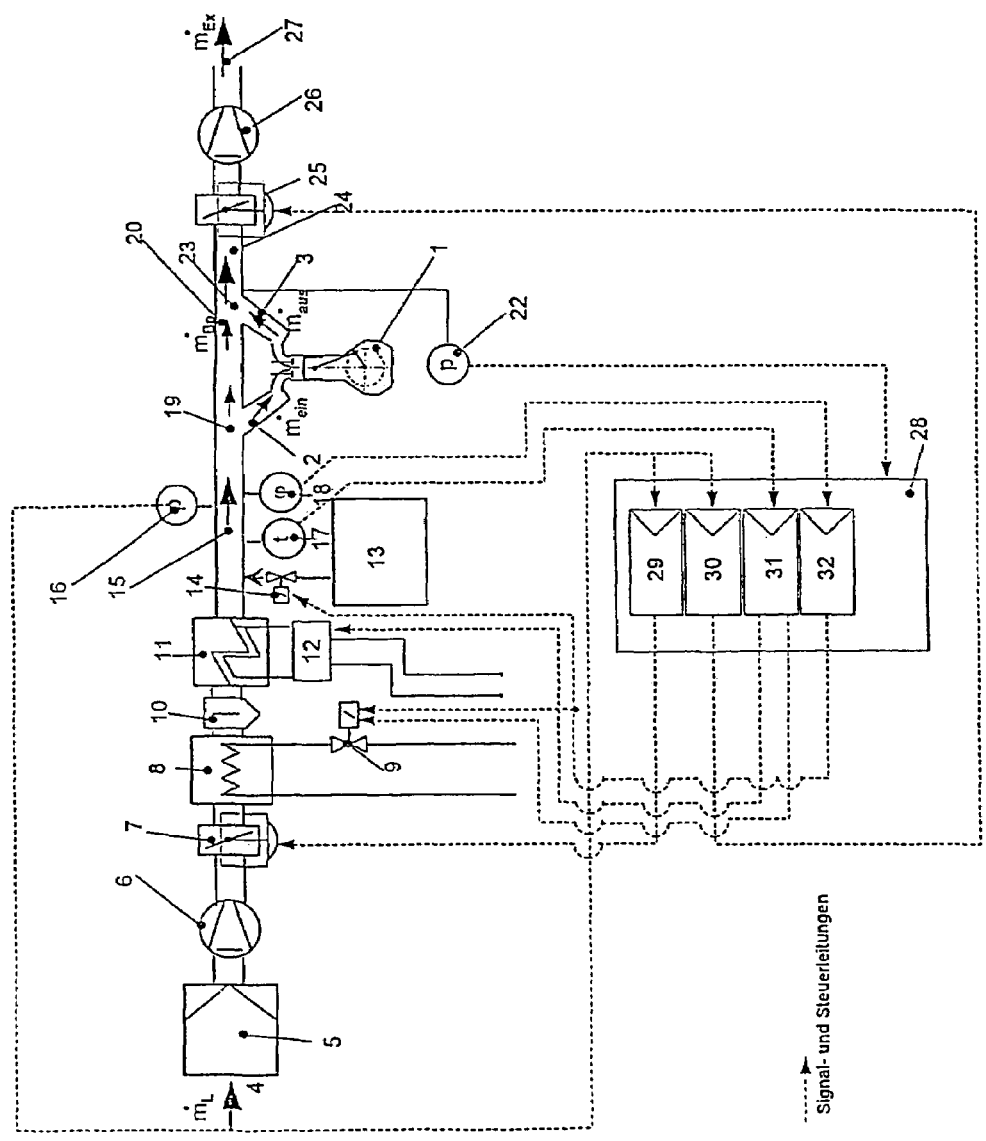
FIG. 2 is an illustration according to FIG. 1 for positive pressure control and negative pressure control without compensation for loss of pressure.

Compensation for Pressure Loss in the Main Line:

A speed-controllable axial fan 22 can be arranged in the line 20 if it is necessary based on special requirements in the quality of pressure control of the air mass flow in the exhaust gas passage. Pressure loss in line 20 is measured by the differential pressure sensor 22 and transmitted as an electric actual signal to the speed-control device for the axial fan 21. This setting of speed occurs in such a manner that pressure loss is compensated in the main line 20 as illustrated in FIG. 2.

If the control accuracy of the exhaust gas backpressure control allows, and there is allowed a small pressure differential to be set precisely between the intake passage 2 and the exhaust gas passage 3, one can do away with speed-controllable axial fan for pressure loss compensation 21 (see FIG. 1) as well as the control device for the axial fan 33.

Figure 3:
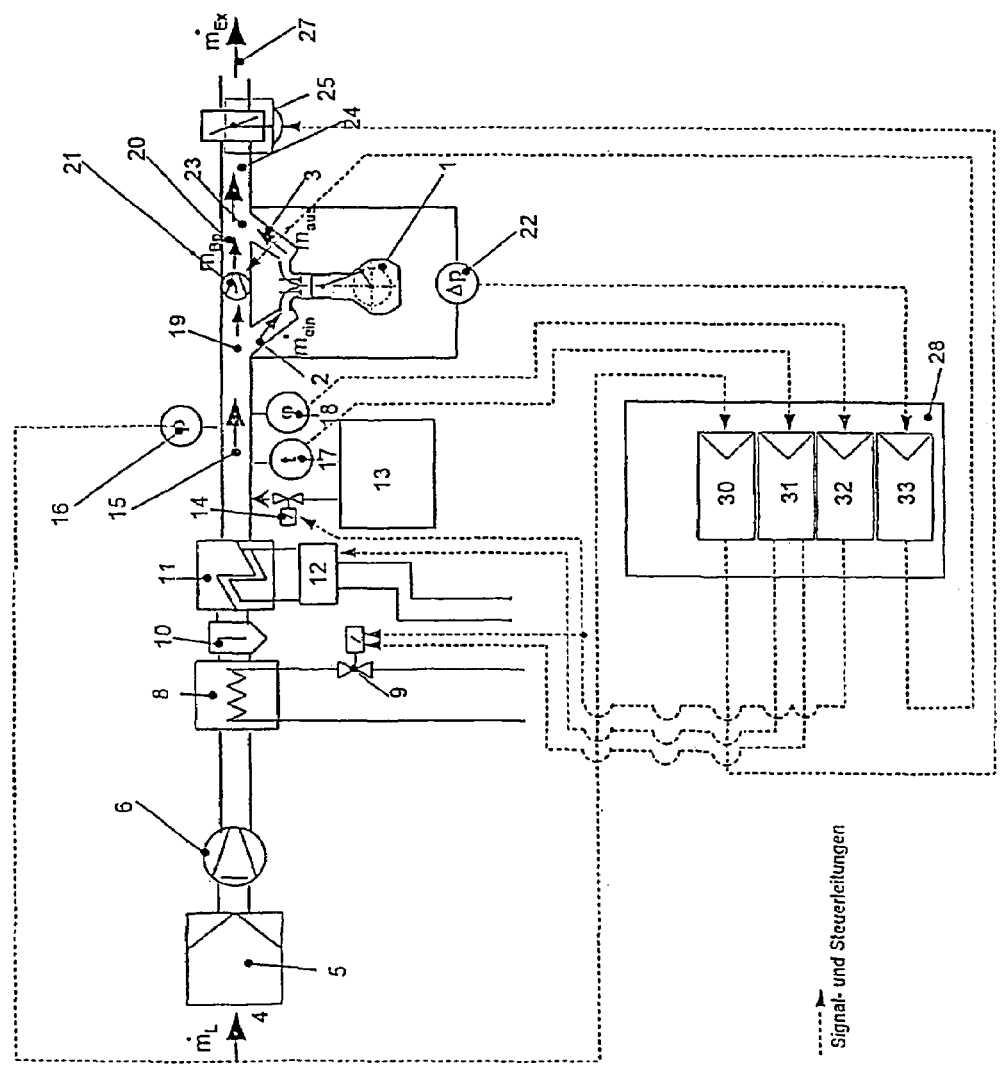
FIG. 3 is an illustration according to FIG. 1 for positive pressure control only.

Embodiment Variation for Pure Positive Pressure Operation:

FIG. 3 shows an embodiment variation that is suitable for pure positive pressure operation (relative to the ambiance.) In comparison to FIG. 1, this embodiment is illustrated by leaving off the components to generate the negative pressure. In this embodiment are missing thereby the butterfly valve for negative pressure operation 6 of FIG. 1, the air-moving device for negative pressure operation 26, as well as the control device for the negative-pressure butterfly valve 29.

Figure 4:
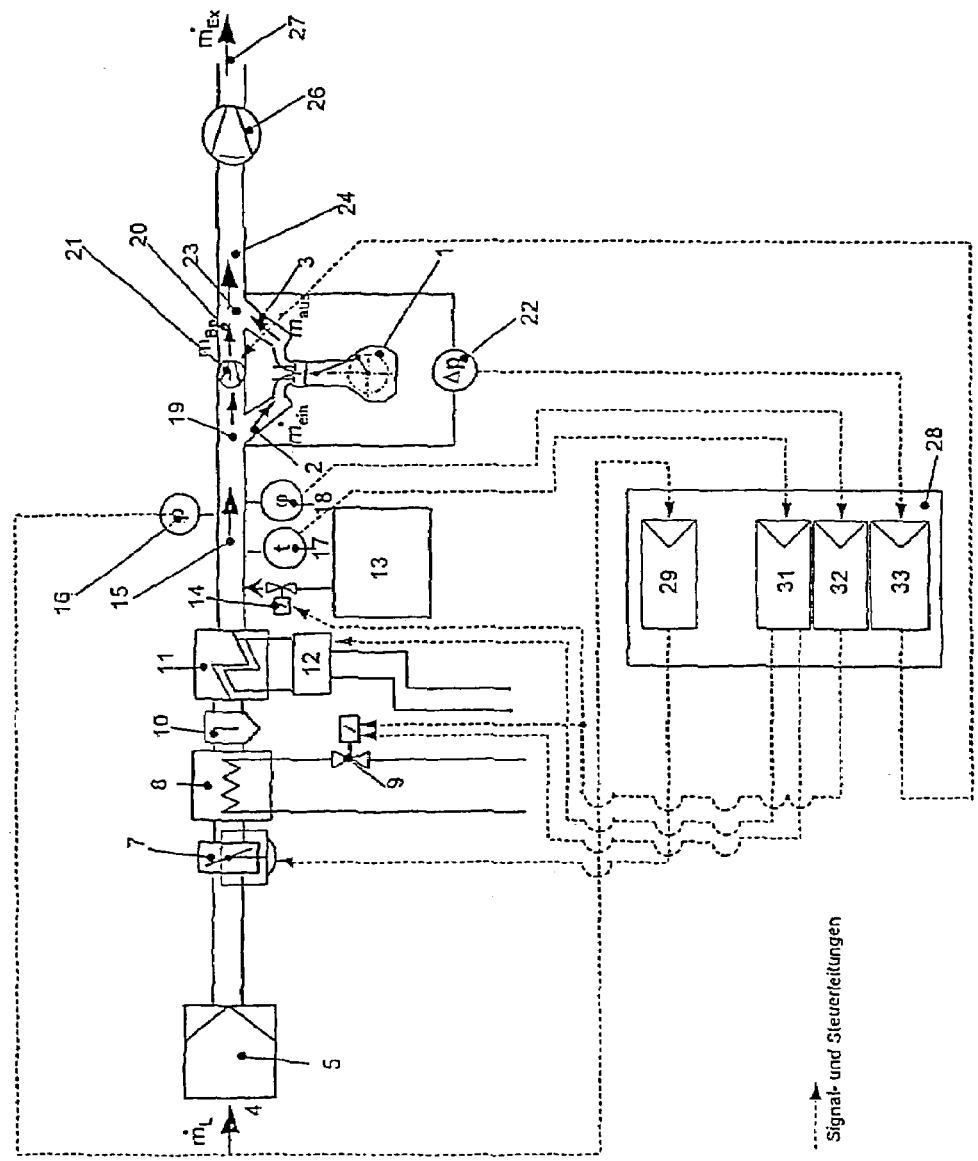
FIG. 4 is an illustration according to FIG. 1 for negative pressure control only.

Embodiment Variation for Pure Negative Pressure Operation (FIG. 4):

FIG. 4 shows an embodiment variation that is suitable for pure negative pressure operation (relative to the ambiance.) In comparison to FIG. 1, this embodiment is illustrated by leaving off the components to generate the positive pressure. In this embodiment are missing thereby the butterfly valve for positive pressure operation 6, the butterfly valve for positive pressure operation 25, as well as the control device for the positive-pressure butterfly valve 30 of FIG. 1

Figure 5:
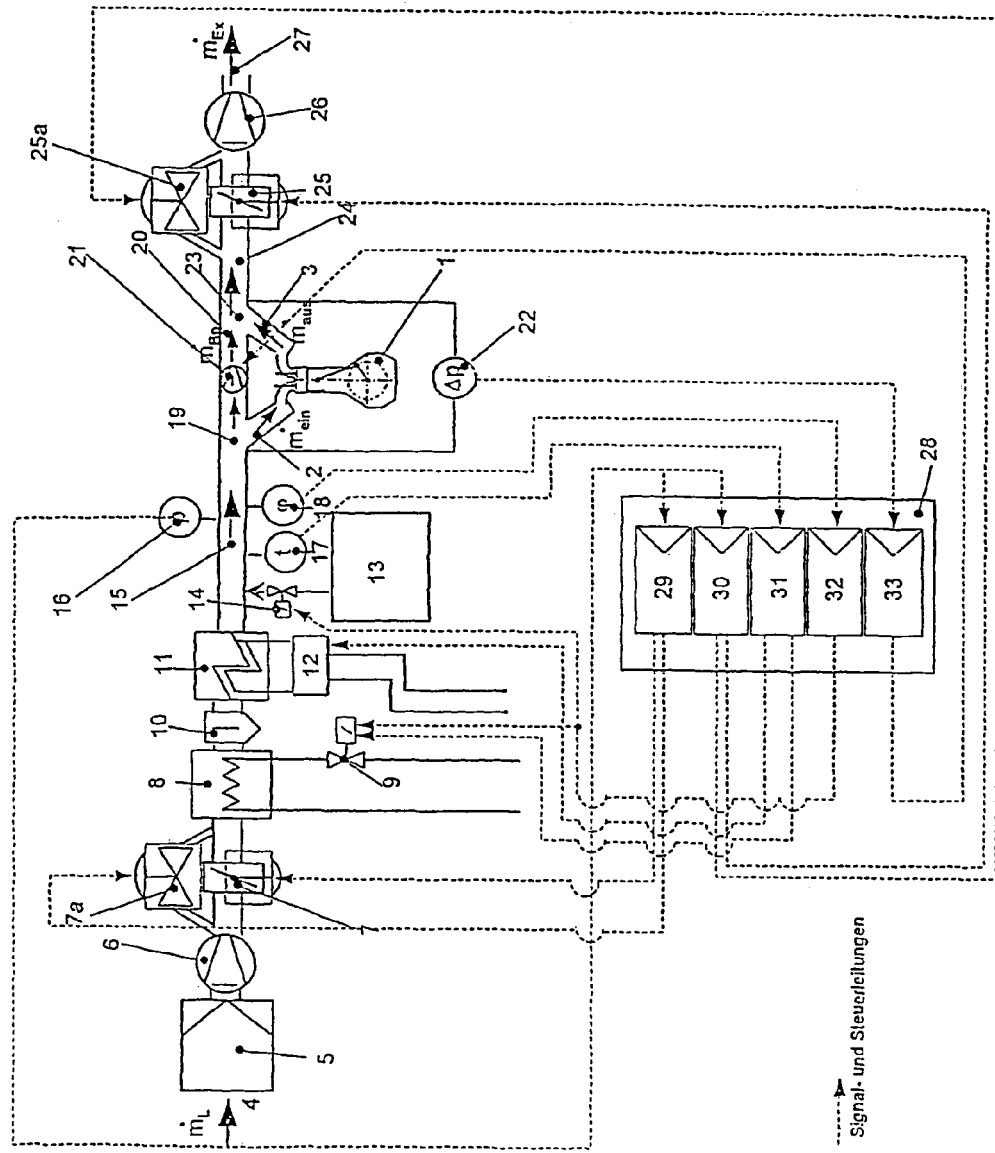
FIG. 5 is an illustration according to FIG. 1 for highly precise negative and positive pressure control.

Embodiment Variation for Highly Precise Air Pressure Control (FIG. 5):

FIG. 5 shows an embodiment of the invention wherein highly precise air pressure control can be realized, that is, for positive pressure as well as for negative pressure. The butterfly valves 6, 25 used for setting the positive pressure or the negative pressure are supplemented through the parallel employment of a respective precision-control valve 7a, 25a, which is dimensioned clearly smaller in flow cross section that the butterfly valves. In this case, setting of the desired air pressure occurs in such a manner that rough adjustment of the air pressure is performed in the beginning with the butterfly valve 7 or 25. After falling below a defined control deviation relative to the actual pressure from the reference pressure, the position of these butterfly valves 7, 25 is maintained and is not changed any more thereafter. The final setting of the desired air pressure occurs subsequently thereof with the aid of the precision-control valve 71 and 25a.

This embodiment variation has the advantage that, on one hand, the air pressure can be brought very quickly near the desired value with the aid of the butterfly valves 7, 25—and, on the other hand, highly precise pressure control can be realized with the finely-tuned precision-control valves 7a, 25a.

In practice, it is especially advantageous if the conditions on the test bench correspond exactly to the conditions existing in the determining operation of the test piece, particularly in vehicle engines, which means also the conditions of air filters, exhaust gas system etc. provided on the vehicle. As schematically illustrated in FIG. 6, the supply line is therefore designed in such a manner that the length of the supply line 15 for the conditioned combustion air, between the branching-off point 19 of the intake passage 2 to the internal combustion engine 1 and the merging point 23 of the exhaust gas line 3 is as long as the complete engine unit, including all components of the intake section upstream and the components of the exhaust section downstream (of the engine), which means that the length between the branching-off point 19 and the merging point 23 corresponds to the distance between the air filter intake 1a and the end of the muffler system 1b of the vehicle.

Figure 6:
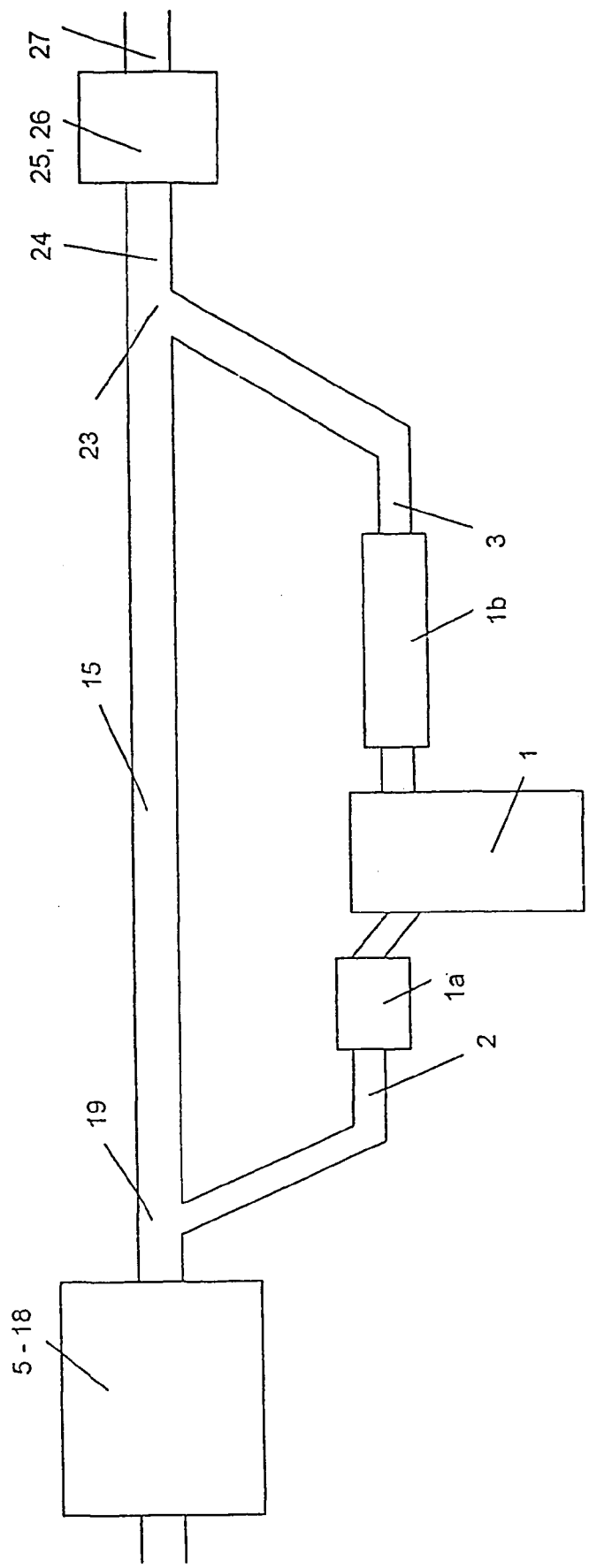
FIG. 6 is a schematic illustration of a system according to the invention with a test piece consisting of an engine provided with an intake section and an exhaust gas section.
Figure 7:
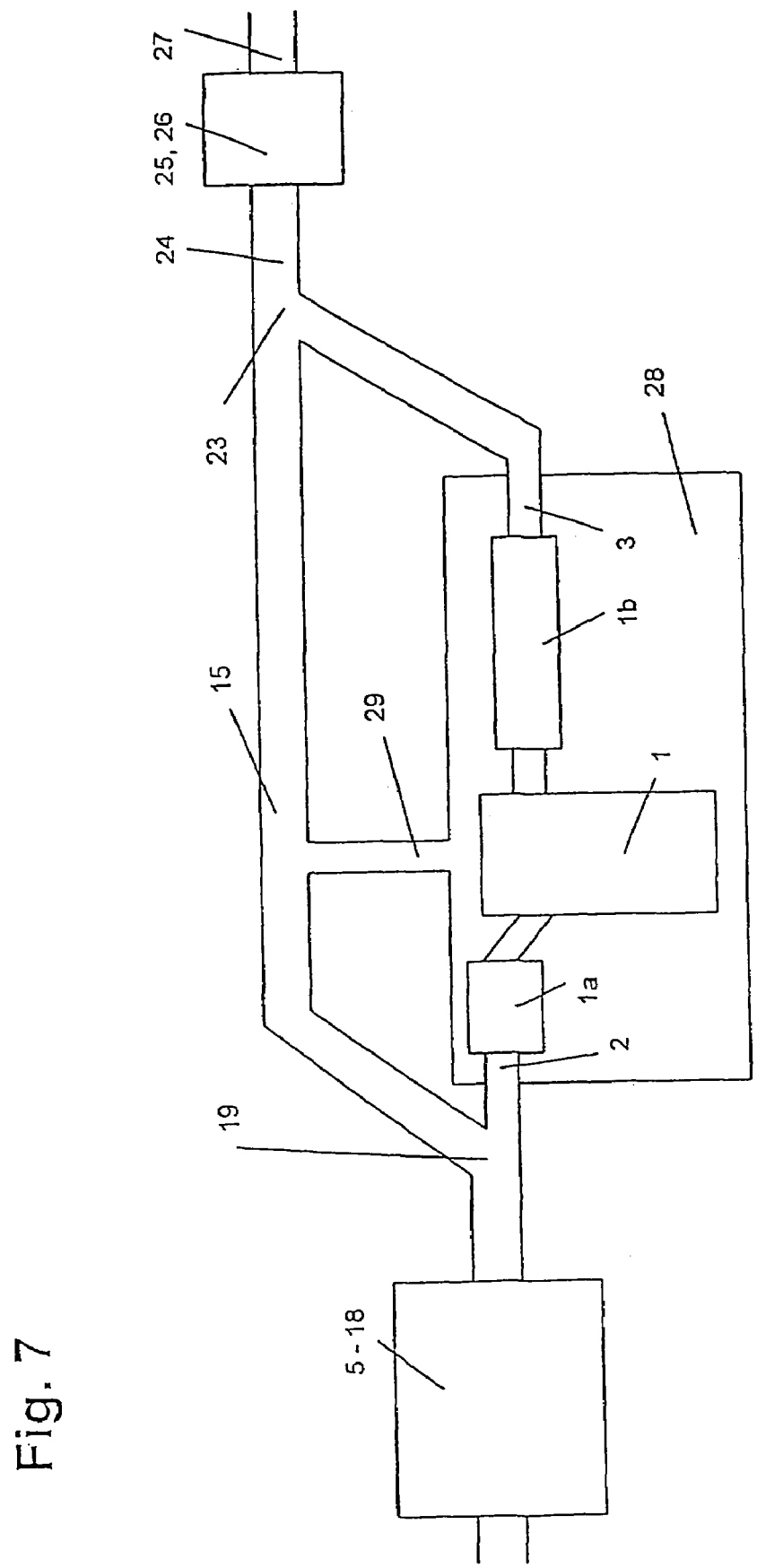
FIG. 7 relates to FIG. 6 whereby the entire engine is disposed inside a closed space.
Figure 8:
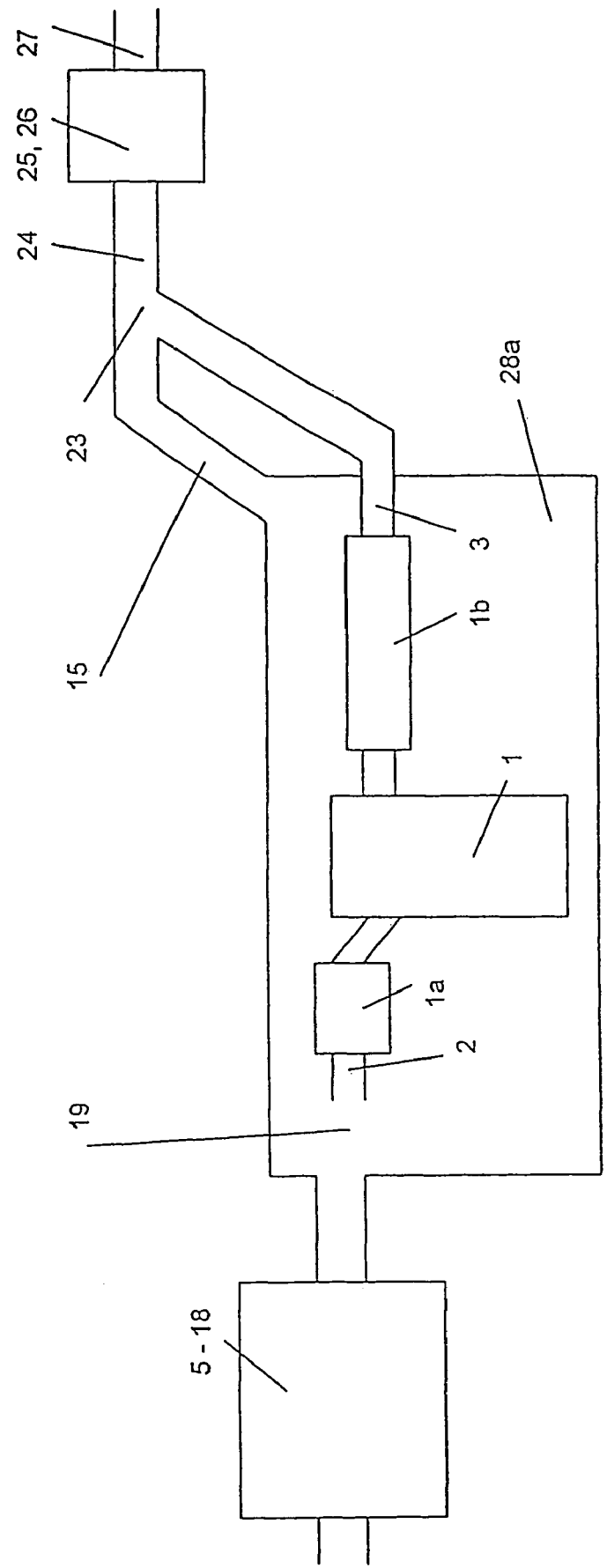
FIG. 8 is a version of the system in FIG. 7 with the box as a flow-through part of the supply line.

FIG. 7 shows an additional advantageous embodiment of the system that corresponds in its basic design to the one in FIG. 6, except that the entire engine, including air filter 1a, muffler system 1b, intake passage 2, and exhaust gas passage 3 are disposed in an closeable and sealable box 28 relative to the ambiance, and whose inner pressure is brought to the pressure of the line 15 through line 29. FIG. 8 shows that the box in FIG. 7 can be designed as a through-flowing section 28a of line 15. It is possible thereby that the engine draws its intake air directly from this box so that the branching-off point 19 becomes located at the intake point of the engine 1, which means through the open end of the intake passage 2. This of advantage since a pipe does not have to be connected to the intake point of the engine, which negatively influences the behavior of the intake section 1a, 2 in some cases.

In the following is to be described the development of the inventive method or the device according to the invention relative to the exhaust gas testing technology whereby the existing quantities of pollutants in the exhaust gas of the engine are to be determined from the measured values of the pollutant concentrations. This is advantageously achieved in the present case by means of a so-called CVS (constant volume sampling) system, which is standardized and which has established precise devices for the determination of the quantities of pollutants in the exhaust gas. The specified high dilution factors can be reached by diverting the exhaust gas of the internal combustion engine 1 into the combustion gas not required for the combustion process and which bypasses said engine. There is also made possible the precisely defined dilution of the exhaust gas with the conditioning of these combustion gases—and now also of the diluent gas at the same time—through the advantageously possible combination and made possible is thereby a precise determination of the quantities of pollutants in a simple and reliable manner.

For determination of the quantities of exhaust gas pollutants in the measurable pollutant concentrations there can be measured the quantity of exhaust gas that either flows directly at the point of sampling—or there will be used the mass balance equation (mass combustion air+fuel mass=exhaust gas mass), which has to be inevitably true for the inventive system consisting of the engine and the accompanying supply and discharge passages for the combustion air or the exhaust gas. It is thereby especially advantageous if the mass flow of the discharging exhaust gas is kept constant. This can be achieved through known means such as a critical nozzle or a Roots blower.

The combustion air bypassing the internal combustion engine 1, which is subsequently used for dilution of the exhaust gas, should be a multiple of the maximum quantity of intake air of the engine so that the exhaust gas is diluted by the same quantity (or more) of diluent air. A generally known CVS system could also be retrofitted in an especially advantageous manner and used for conditioning of the intake air according to the invention whereby the intake air of the motor is taken from the conditioned fresh air of the CVS system and the exhaust gas is fed to the exhaust gas diluting system as proposed in the CVS system.

The inventive system is advantageously employed to condition the intake air to overcome the difficulties in measuring of the intake-air mass flow or exhaust-gas mass flow for analysis of the more or less diluted exhaust gas and said system is used for relatively minor dilution whereby the necessary flow measurement in the region of the supplied, conditioned intake air occurs still upstream from the branching-off point of the bypass line. This has the advantage that highly precise sensors can be employed for a nearly constant and pulsation-free air flow even at dynamic operation of the engine.

For additional improvement in measuring the intake-air mass flow or the exhaust-gas mass flow for analysis of the more or less diluted exhaust gas, it is proposed that the inventive system is employed to condition the intake air and used for exhaust gas analysis with comparatively minor dilution.

It may be furthermore proposed that in exhaust gas analysis, an additional dilution system is used for employment after the relative minor exhaust gas dilution by the inventive system, which allows a possibly required additional exhaust gas dilution. This can be of advantage especially when the necessary conditioning requirements differ to a great degree from the operation of the engine and from the important dilution of exhaust gas.

Figure 9:
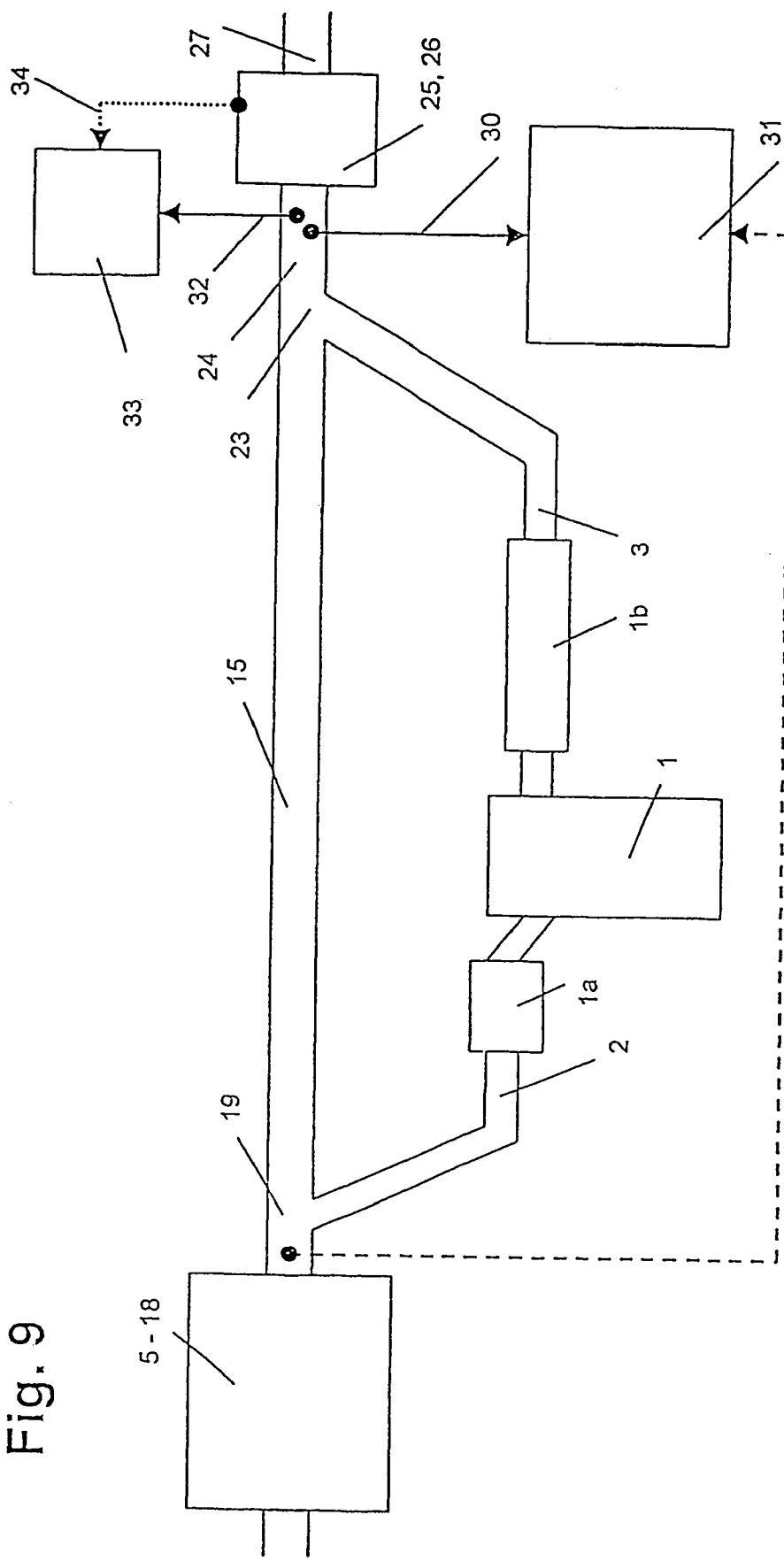
FIG. 9 corresponds to FIG. 6 whereby measuring points or sampling points are provided for measuring pollutant quantities.

A first embodiment example for a system to measure the quantities of pollutants is illustrated in FIG. 9 whereby said system corresponds to the one in FIG. 6 in its basic design, except that there is provided in line 24 a measuring point 30 for an exhaust gas analyzer 31 as well as a measuring point 32 for a flow determination device 33. The determination of flow is performed in line 24 with an exhaust-gas mass flow sensor, but in many cases determination will be sufficient using exhaust gas pressure sensors and temperature sensors under consideration of an calibration factor and possibly additional signals of the unit 25, 26 (e.g. the speed of a Roots blower), which signals can be transmitted via the signal line 34 illustrated by a dotted line.

In some cases, for example during measuring of particle content and hydro carbon content in the exhaust gas of diesel fuel, the temperature of the diluent air at point 23 must not drop below a certain limit, for instance 50° C., since otherwise exhaust gas constituents may condense and break down. It would therefore be necessary to provide a heating element (nor illustrated) in line 15 between points 19 and 23 that subsequently heats up the conditioned air in the conditioning system 5-18 to the required diluting temperature. It could be possibly also be necessary for the protection of the intake fan to cool the exhaust gas for exhaust gas analysis downstream from the measuring point. An additional measuring point 35 may advantageously be provided for the determination of the pollutant concentration of the diluent gas in the supply passage 15, upstream of its merging point 23 into the exhaust gas passage, preferably even upstream of the branching-off point 19 of the intake passage 2 leading to the internal combustion engine 1. A line 36 leads from this measuring point 35 to the exhaust gas analyzer 31.

Figure 10:
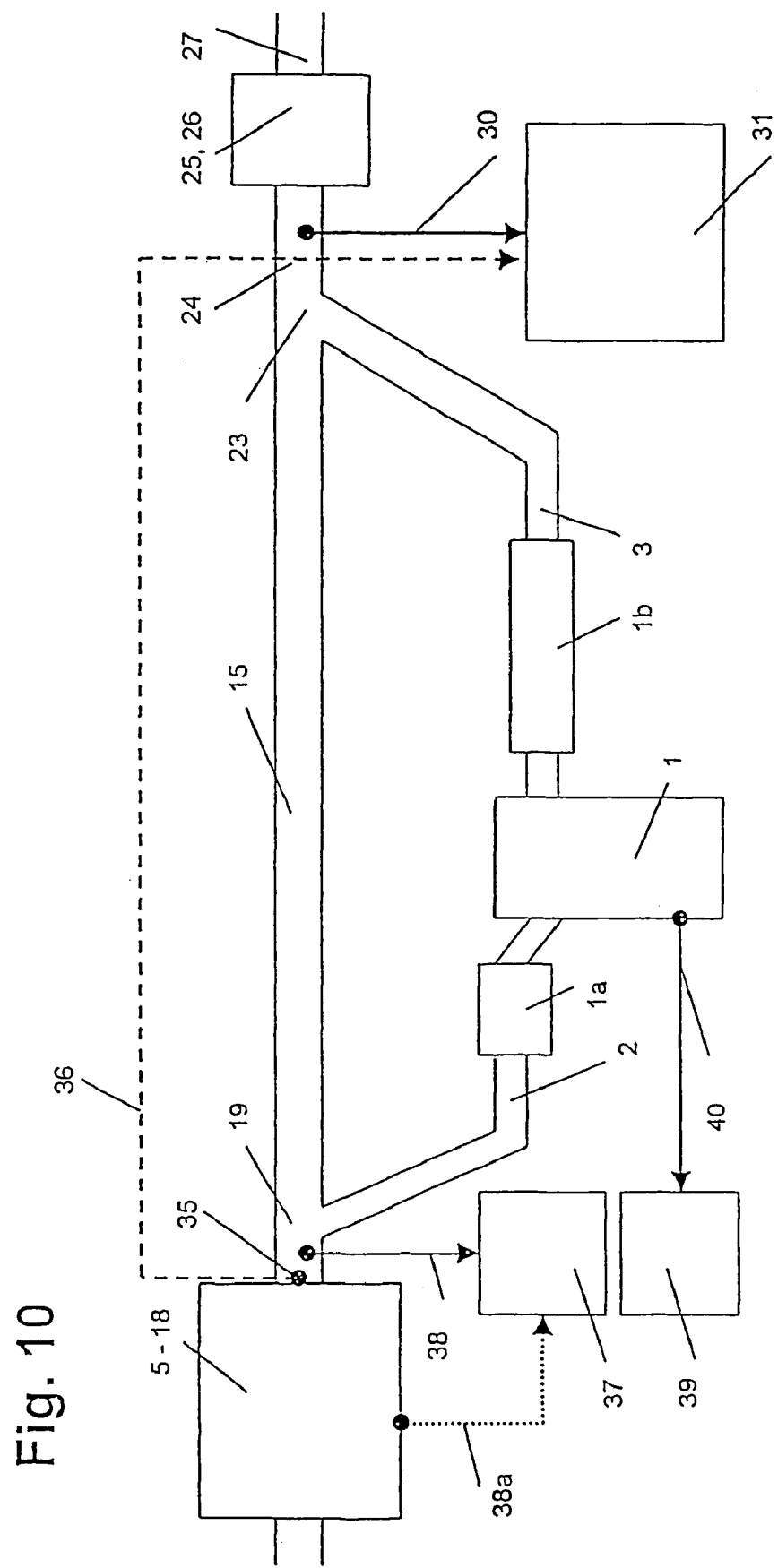
FIG. 10 is an embodiment of the invention corresponding to FIG. 9, but with another arrangement of the measuring points or sampling points and the sensors.

FIG. 10 corresponds to FIG. 9, except that one determination device 37 is assigned not for the flow of diluted exhaust gas in 24 but for the entire quantity of air upstream from point 19. The unit 37 is preferably again a gas-mass flow sensor; however, in many cases determination will be sufficient using gas pressure sensors and temperature sensors under consideration of a calibration factor and possibly additional signals of the unit 5-18 (for instance, the speed of a Roots blower), whereby said signals can be transmitted by the signal line 38 illustrated by a dotted line. However, there is need here supplementary a determination unit 39 for fuel consumption with a measuring point 40 on the engine 1 or in the fuel delivery system of the engine.

Figure 11:
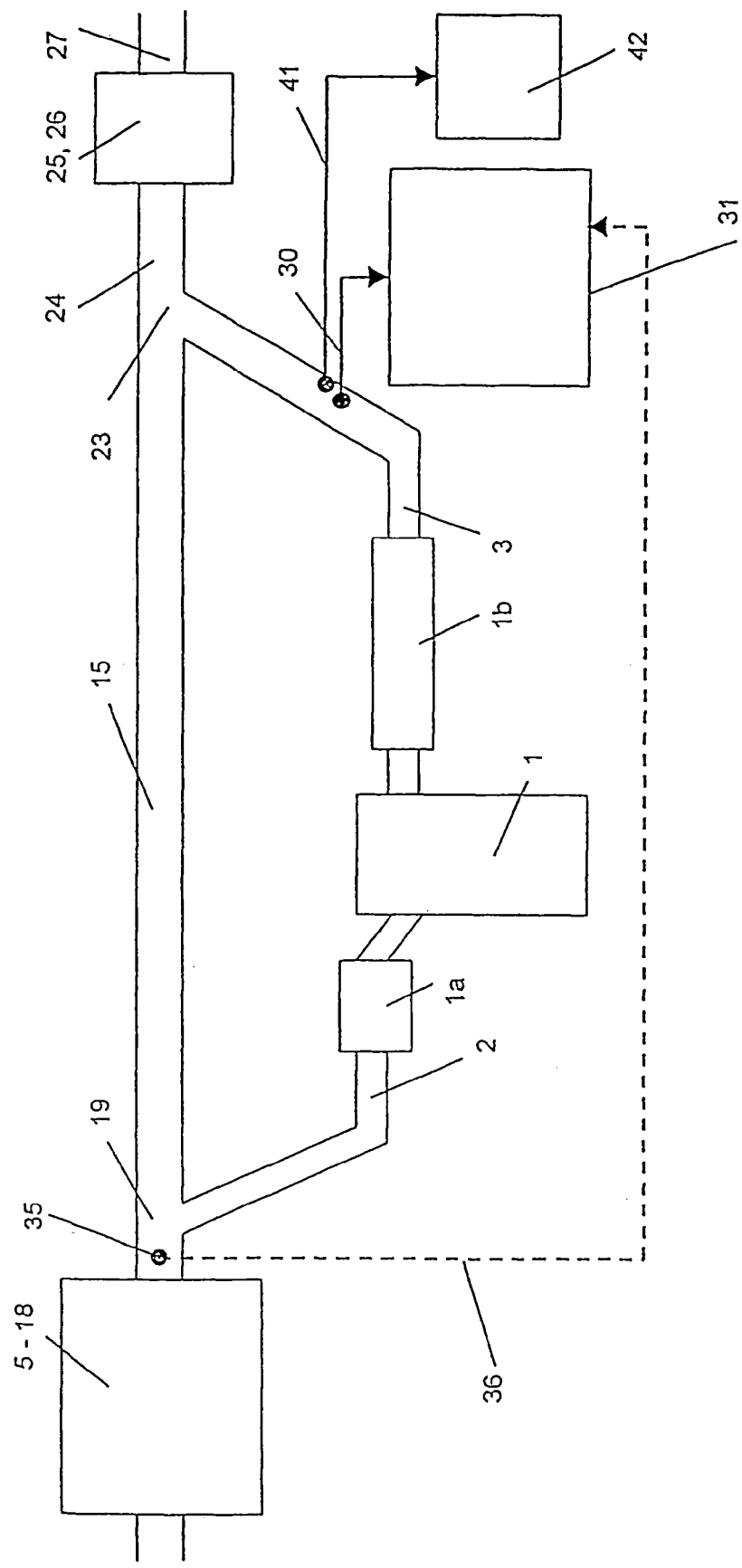
FIG. 11 is an embodiment according to FIG. 6 with yet another arrangement of the measuring points or sampling points and the sensors.

FIG. 11 corresponds to FIG. 6, except that the measuring point 30 for an exhaust gas analyzer 31 is arranged in the exhaust gas line 3 and serves also for analysis of the undiluted exhaust gas. For conversion of the pollutant concentration to pollutant quantities is could be possibly desirable to provide a measuring point 41 for a determination unit 42 to determine the flow of the undiluted exhaust gas in line 3.

Figure 12:
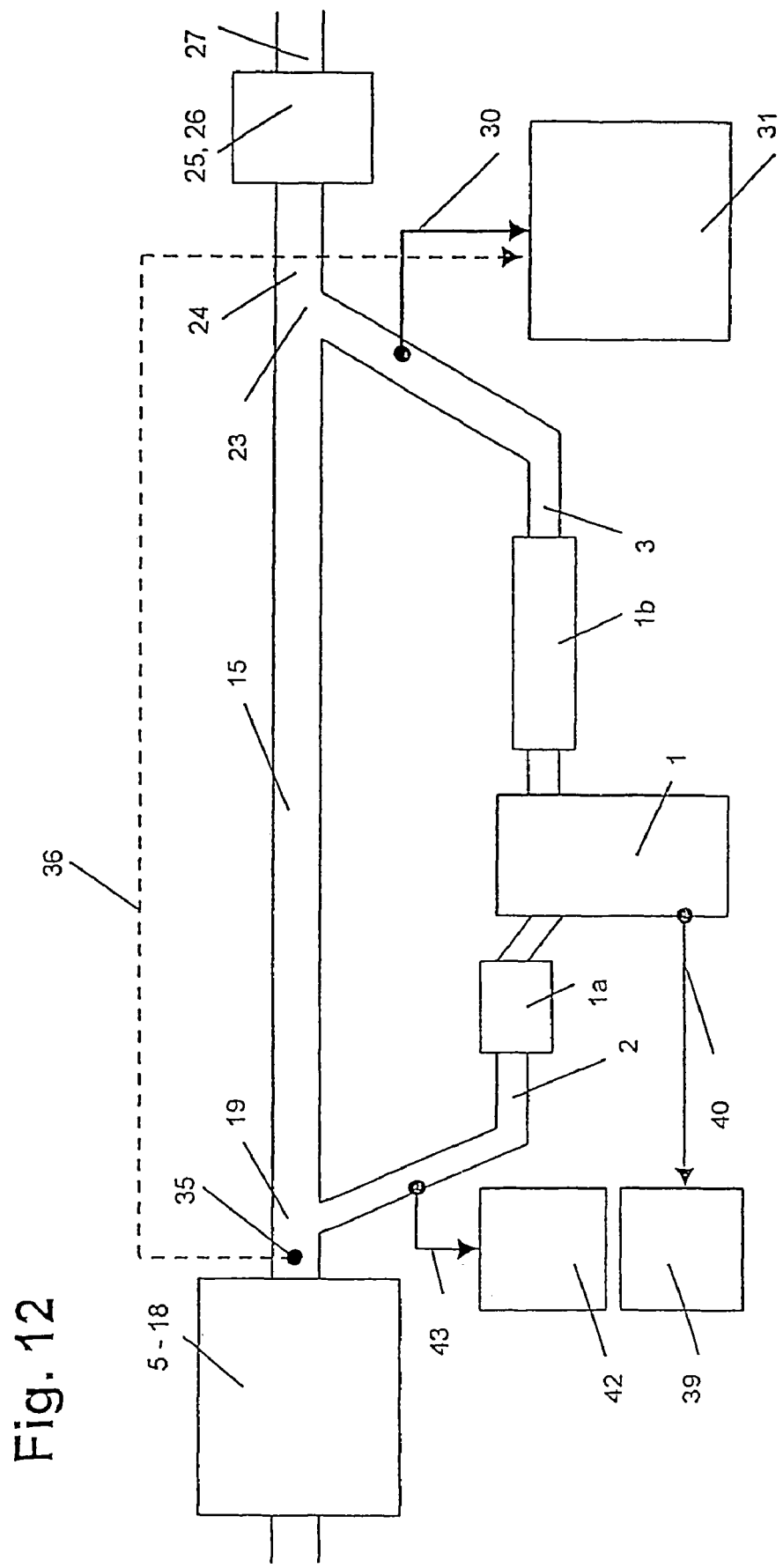
FIG. 12 illustrates an embodiment of the system according to the invention wherein determination units are provided for the flow of combustion air and for fuel consumption.

FIG. 12 corresponds to FIG. 11, except that determination units 42 are herein provided for the intake air of the engine with a measuring point 43 in line 2 and for fuel consumption 39, 40 (similar to FIG. 10.)

Figure 13:
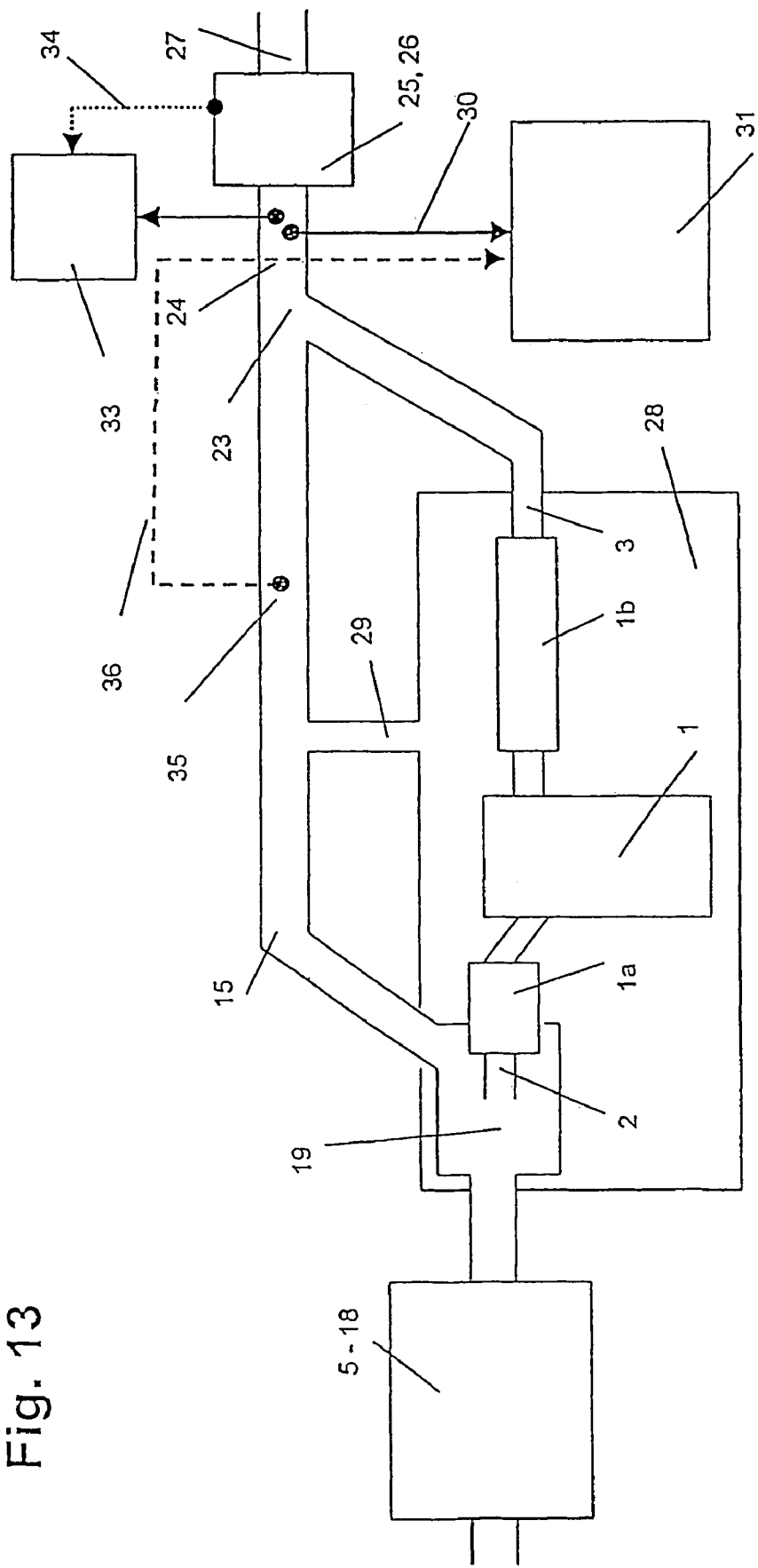
FIG. 13 is an embodiment which makes possible the conditioning of the intake air and the simulation of the ambient pressure, particularly high-altitude simulation, and it makes the analysis of exhaust gas possible as well.

FIG. 13 could be a preferred embodiment that makes possible, in an especially advantageous manner, the conditioning of intake air and ambient pressure simulation, particularly high-altitude simulation, as well as exhaust gas analysis. It is shown that element 19 is designed having an enlarged, flow-through volume as part of line 15, which makes possible thereby free intake of the conditioned air through the intake system 2 and 1a of the engine. This volume 19 is disposed within the box 28 together with the intake system 1 and the engine 1 as well as the exhaust gas system 1b whereby said box 28 is still in pressurized communication with line 15 via line 29. This has the advantage that the exhaust gas analysis is not disrupted by possible vapors from the dirt on the outside of the engine. Even so, it cannot be completely ruled out that pollutants from said box enter the passage 15 through the pressure connection line 29, even though box 28 has no cross flow of diluent air in this case. It can thereby be of advantage if, in contrast to FIG. 9, the measuring point 35 for possible existing pollutants of the diluent air are arranged in the passage 15 only downstream from the connection point of line 29, for example, but still upstream of point 23, of course. The measuring points 30 and 32 for flow and pollutant concentration of the diluted exhaust gas are provided on line 24, just as in FIG. 9.

The invention claimed is:

1. A method for determining the quantities of pollutants in the exhaust gases of an internal combustion engine, including the determination of the pollutant concentration and the quantity of the flowing exhaust gas whereby diluting of the exhaust gas takes place by using a diluent gas of known composition, characterized in that an essentially constant and fully conditioned quantity of humidity and/or temperature-conditioned combustion gas is supplied to the internal combustion engine at each instant whose quantity corresponds to at least the maximum quantity required by the respective combustion engine, and whereby the exhaust gas is diluted with the quantity of combustion gas that is not used by the internal combustion engine.

2. A method according to claim 1, whereby the flow of exhaust gas, diluted by the quantity of unused combustion gas, is kept constant and whereby there is determined the quantity of combustion gas, is kept constant and is defined.

3. A method according to claim 1, whereby the flow of discharging exhaust gas, diluted by the unused quantity of combustion gas, is kept constant and is defined.

4. A method according to claim 1, whereby the flow of the supplied combustion gas is kept constant, and its quantity and the quantity of the fuel supplied to the internal combustion engine is determined.

5. A method according to claim 1, whereby the flow of the supplied combustion gas is kept constant and the flow of the diluted exhaust gas is determined.

6. A method according to claim 5, whereby the determination of pollutant concentration occurs in the exhaust gas, which is diluted with the quantity of combustion gas not used by the internal combustion engine.

7. A method according to claim 5, whereby the determination of pollutant concentration occurs in the undiluted exhaust gas.

8. A method according to claim 7, whereby the pollutant concentration in the available combustion gas is determined in addition.

9. A method according to claim 8, whereby the quantity of available combustion gas is a multiple of the maximum quantity required by the combustion engine.

10. A method according to claim 9, whereby the combustion gas/exhaust mixture downstream from the internal combustion engine is moved by suction, preferably by a defined negative pressure relative to the atmospheric pressure.

11. A method according to claim 9, whereby the combustion gas is delivered to the internal combustion engine through increased pressure relative to the atmospheric pressure or whereby unneeded combustion gas bypasses the internal combustion engine.

12. A method according to claim 11, whereby a pressure drop is set between 0.3 and 5 mbar, preferably between 0.5 and 3 mbar, between the conditioned combustion gas and the exhaust gas or between the combustion gas/exhaust gas mixture downstream from the internal combustion engine.

13. A method according to claim 12, whereby the flow is kept essentially constant, independent from the absolute pressure.

14. A method according to claim 13, whereby the direct ambiance of the internal combustion engine is kept at the same pressure as the pressure of the conditioned combustion gas.

15. A method according to claim 14, whereby a flow of conditioned combustion gas surrounds the internal combustion engine.

16. A device to determine the quantities of pollutants in the exhaust gas of an internal combustion engine comprising at least one measuring point, for example a sensor or sampling device, for determination of the pollutant concentration, and a determination device for the flow of gas whereby said determination device is provided with a passage leading from the exhaust gas passage to supply passage for a diluent gas of known composition, characterized in that the supply passage for the diluent gas is designed for at least the maximum quantity of combustion gas required by the respective internal combustion engine and whereby an intake line, which can be connected to the internal combustion engine, branches off from said supply passage.

17. A device according to claim 16, wherein the supply passage for the diluent gas is designed for a multiple of the maximum quantity of combustion gas required by the respective internal combustion engine.

18. A device according to claim 16, wherein the measuring point to determine the pollutant concentration is arranged in the exhaust gas passage, downstream from the merging point of the exhaust gas passage into the supply passage for the diluent gas.

19. A device according to claim 16, wherein the measuring point for the determination of the pollutant concentration in the exhaust gas passage is arranged upstream from its merging point into the supply passage of the diluent gas.

20. A device according to claim 19, wherein an additional measuring point to determine the pollutant concentration in the supply passage for the diluent gas is provided upstream from the merging point of the exhaust gas passage into said supply passage.

21. A device according to claim 20, wherein the determination device for the flow of gas is arranged in the same section as the measuring point for the determination of the pollutant concentration.

22. A device according to claim 20, wherein the determination device for the flow of gas is provided in the supply line for the diluent gas.

23. A device according to claim 22, wherein a measuring device is provided for the fuel mass delivered to the internal combustion engine.

* * * * *